United States Patent
Govindan Nair et al.

(10) Patent No.: US 12,074,782 B2
(45) Date of Patent: Aug. 27, 2024

(54) SYSTEM AND METHOD FOR ELIMINATING DATA LOSS IN A VIRTUALLY AGGREGATED NETWORK

(71) Applicant: HEWLETT PACKARD ENTERPRISE DEVELOPMENT LP, Houston, TX (US)

(72) Inventors: Anoop Govindan Nair, Bangalore (IN); Ankit Kumar Sinha, Bangalore (IN); Veerendranatha Reddy Vallem, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 638 days.

(21) Appl. No.: 17/228,073

(22) Filed: Apr. 12, 2021

(65) Prior Publication Data

US 2022/0052938 A1 Feb. 17, 2022

(30) Foreign Application Priority Data

Aug. 11, 2020 (IN) .............................. 202041034468

(51) Int. Cl.
*H04L 45/12* (2022.01)
*H04L 45/028* (2022.01)
*H04L 45/44* (2022.01)
*H04L 45/586* (2022.01)

(52) U.S. Cl.
CPC .......... *H04L 45/123* (2013.01); *H04L 45/028* (2013.01); *H04L 45/44* (2013.01); *H04L 45/586* (2013.01)

(58) Field of Classification Search
CPC ..... H04L 45/123; H04L 45/44; H04L 45/028; H04L 45/586
See application file for complete search history.

(56) References Cited

U.S. PATENT DOCUMENTS

| | | | | |
|---|---|---|---|---|
| 6,147,971 | A | * | 11/2000 | Rochberger ............ H04L 45/10 370/255 |
| 9,485,135 | B1 | * | 11/2016 | Sarkar .................. H04L 41/0654 |
| 9,838,246 | B1 | | 12/2017 | Hegde et al. |
| 9,967,174 | B2 | * | 5/2018 | Singh .................. H04L 12/1854 |
| 10,554,585 | B2 | | 2/2020 | Takajo et al. |

(Continued)

FOREIGN PATENT DOCUMENTS

WO 2014/174439 A1 10/2014

*Primary Examiner* — Redentor Pasia
(74) *Attorney, Agent, or Firm* — Hewlett Packard Enterprise Patent Department

(57) ABSTRACT

A system and a method for eliminating data loss in a virtually aggregated network are described. A first network device may identify inactivity of a central network device present in a communication network. The central network device is responsible for distributing routing information between a plurality of network devices including the first network device. The first network device delays network route calculations until a second network device is elected from the plurality of network devices to perform functions of the central network device. The second network device generates link state information related to the plurality of network devices, and shares the link state information with the plurality of network devices. Upon receiving the link state information, the plurality of network device may resume the route calculations.

20 Claims, 5 Drawing Sheets

(56) References Cited

U.S. PATENT DOCUMENTS

| | | | |
|---|---|---|---|
| 10,834,004 B2 * | 11/2020 | Yigit | H04L 43/0852 |
| 10,855,583 B2 * | 12/2020 | Raj | H04L 45/20 |
| 11,552,841 B2 * | 1/2023 | Dong | H04L 65/40 |
| 2015/0117182 A1 * | 4/2015 | Xu | H04L 41/0816 |
| | | | 370/254 |
| 2016/0020939 A1 * | 1/2016 | Ramasubramanian | |
| | | | H04L 41/0659 |
| | | | 370/217 |
| 2017/0141963 A1 * | 5/2017 | Chalapathy | H04L 49/25 |
| 2019/0149357 A1 * | 5/2019 | Wang | H04L 41/0806 |
| | | | 370/401 |

* cited by examiner

SYSTEM AND METHOD FOR ELIMINATING DATA LOSS IN A VIRTUALLY AGGREGATED NETWORK

BACKGROUND

A computer network allows sharing of resources and data between devices. Typically, a computer network transmits data in portions, called data packets, through several network links established between multiple network devices. Such network links are often affected by congestion that causes reduced quality of service. Network link congestion is a type of congestion wherein a link between paired network devices fail when an upstream node is not able to process data packets.

To resolve the network link congestion, Link Aggregation (LAG) between multiple network nodes is generally utilized. LAG essentially combines multiple links or ports of each of the connected/paired network nodes into one logical link. Such combination of links between the pair of network nodes provides increased bandwidth/throughput and link failure recovery is in sub-second order.

Alternatively, network congestion may occur due to failure of a network node. Spanning Tree Protocol (STP) is used in such scenarios to provide node level redundancy. However, STP blocks alternate links, so load balancing or bandwidth gain are not obtained through usage of STP. Further, upon usage of STP, a typical re-convergence time during failure of a network node is not sub-second or immediate.

In order to provide node level redundancy, Link Aggregation (LAG) such as Multi Chassis LAG (MCLAG) is used. Within an MCLAG, multiple network switches are linked with each other to function as a single node providing redundancy. Each network switch present in the MCLAG is connected with end devices. In case of a failure of a network switch of the MCLAG, another network switch of the MCLAG continues to maintain data flow between the end devices. Therefore, MCLAG provides node level redundancy in addition to providing load balancing, increased aggregate bandwidth, and sub-second failure recovery. Such network of devices using the LAG is known as a virtually aggregated network. A virtually aggregated network provides multiple control planes and a single virtual data plane for network devices connected with the virtually aggregated network.

A virtually aggregated network utilizes specific routing protocols for allowing exchange of routing information between network devices present within the virtually aggregated network. Open Shortest Path First (OSPF) is one such specific routing protocol that implements Link State Routing (LSR) algorithm to identify a shortest network path between a source device and a receiver device. Network devices form adjacencies upon detection of neighbouring devices, for example upon receipt of Hello packet sent by the neighbouring devices.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles related to the present disclosure. The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
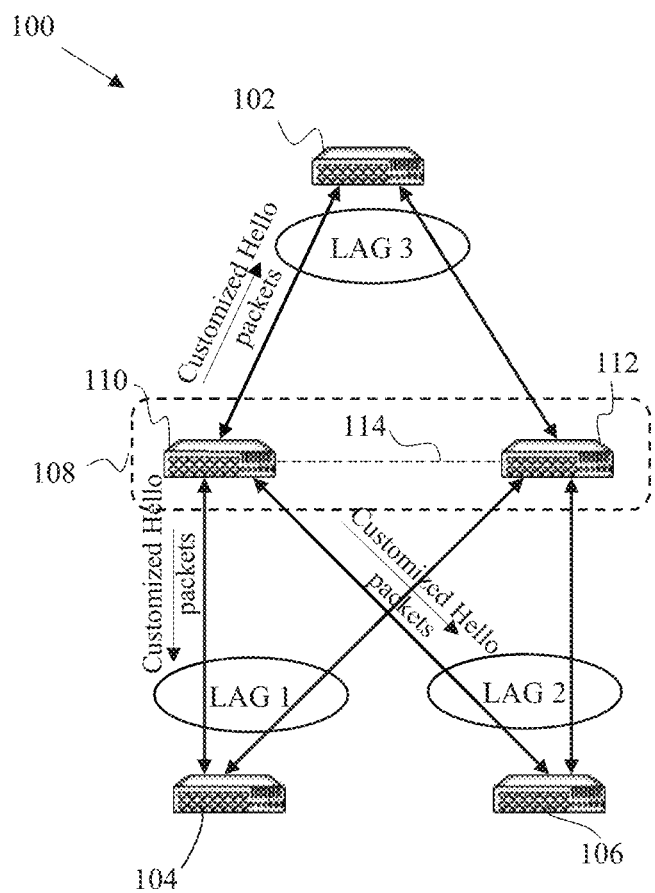
FIG. 1 illustrates a connection diagram of a virtually aggregated network, in accordance with an embodiment of the present disclosure.

In a virtually aggregated network utilizing Open Shortest Path First (OSPF) protocol, data loss occurs for a brief period of time when a peer device of the virtually aggregated network becomes inactive. Specifically, such loss of data occurs when the peer device of the virtually aggregated network is a central network device i.e. a Designated Router (DR), and such peer device becomes inactive or unavailable. The peer device of the virtually aggregated network may become inactive or unavailable upon occurrence of a hardware fault, rebooting, or during a software update.

When a peer device of a virtually aggregated network, functioning as a DR, becomes inactive, such inactivity of the DR is quickly determined by other network devices connected with the virtually aggregated network. Immediately upon determining inactivity of the DR, information of network routes reachable through the DR are dropped by the other network devices. Successively, a new DR is elected amongst the other network devices. Upon being elected, the new DR performs route calculations, and route information is then shared with the other network devices. Using such route information received from the new DR, the other network devices begin data communication. Although the process of election of the new DR and determining of route information by the new DR gets completed within a very brief period of time, generally 5 to 10 seconds, but leads to a downtime of connection service provided by the virtually aggregated network. Any data request arriving in the computer network during such instance would get dropped.

The current disclosure proposes a system and a method for eliminating data loss in a virtually aggregated network. The proposed system utilizes a plurality of network devices connected to a central network device which is a virtually aggregated network switch responsible for distributing routing information between the plurality of network devices.

In one instance, the central network device may become inactive for a brief time period. Inactivity of the central network device may be scheduled or unscheduled, and may be associated with network events comprising software update, software failure, maintenance, and rebooting. The plurality of network devices would identify the inactivity of the central network device.

Upon determining inactivity of the central network device, network route calculations of the plurality of network devices may be delayed. The network route calculations may be delayed until a network device is elected amongst the plurality of network devices to perform functions of the central network device. Upon being elected, the new central network device may generate link state information related to the plurality of network devices, and may share the link state information with the plurality of network devices. In one case, the link state information may comprise routing information related to the plurality of network devices. The link state information may be used by each network device of the plurality of network devices to determine shortest network paths to its neighboring network devices.

Upon receiving the link state information, the plurality of network devices may resume their route calculations. In this manner, the plurality of network devices may not withdraw the route information immediately upon detecting inactivity of the central network device, and thereby up-time may be improved in a virtually aggregated network.

The detailed description set forth below in connection with the appended drawings is intended as a description of various embodiments of the present disclosure and is not intended to represent the only embodiments in which details of the present disclosure may be implemented. Each embodiment described in this disclosure is provided merely as an example or illustration, and should not necessarily be construed as preferred or advantageous over other embodiments.

FIG. 1 illustrates a connection diagram of a virtually aggregated network 100, in accordance with an embodiment of the present disclosure. A plurality of network devices connected in the virtually aggregated network 100 may be utilizing OSPF protocol. A network device 102 is connected with network devices 104 and 106 for receiving data, through a virtually aggregated network pair 108. The virtually aggregated network pair 108 includes network devices 110 and 112 as network peers. The network devices 110 and 112 are linked together by a synchronization or switch link 114, to provide continued data flow. In an aspect, the network devices 110 and 112 may be Virtually Switching Extension (VSX) peers. In one implementation, the network devices 102, 104, 106, 110, and 112 may be routers and/or switches. For the ease of illustration, the virtually aggregated network 100 is shown to include a limited number of network devices; however, numerous network devices would generally be present in a typical virtually aggregated network.

Within the virtually aggregated network pair 108, one of the network devices 110 and 112 will act as a primary device and the other will act as a secondary device. Although, the primary device and the secondary device are two different network devices, for example switches, within the virtually aggregated network pair 108, they form a switch pair and act on a single virtual data plane for allowing movement of data traffic.

Data traffic would flow from South to North direction through any of the network devices 110 and 112. Data received from the network devices 104 and 106 would be sent to a virtual Media Access Control (MAC) address which will be honored by both the network devices 110 and 112. Both the network devices 110 and 112 would include details of network path connecting the network device 102. Thus, data received from the network devices 104 and 106 could be forwarded to the network device 102 by any of the network devices 110 and 112.

In one scenario, when Open Shortest Path First (OSPF) protocol is implemented within the virtually aggregated network 100, the network device 110 of the virtually aggregated network pair 108 may be selected as a central network device i.e. a Designated Router (DR). Further, the network device 112 may be selected as a backup central network device i.e. a Backup DR (BDR). Although the network device 112 is considered to be the backup central network device in several embodiments of the current disclosure, any of the other network devices 102, 104, and 106 could be selected as the backup central network device in other embodiments. Selection of the central network device and the backup central network device may be performed through a suitable election algorithm.

Upon being selected as the central network device, the network device 110 may become responsible for distributing routing information between the network devices 102, 104, and 106. Hereinafter, the network device 110 may be referred as a central network device 110.

Upon implementation of OSPF protocol within the virtually aggregated network 100, communication may occur between the central network device 110 i.e. the DR and other network devices. For example, link state information may be shared by the central network device 110 i.e. the DR with other network devices. The link state information would allow each of the other network devices to determine their distances with remaining network device. Further, connectivity determining data packets i.e. Hello packets are also shared by each network device to indicate their status in the virtually aggregated network 100. The Hello packets could be customized to produce customized Hello packets. The customized Hello packets may include Type Length Values (TLVs) for conveying a required information, as described in detail in successive embodiments.

Figure 2:
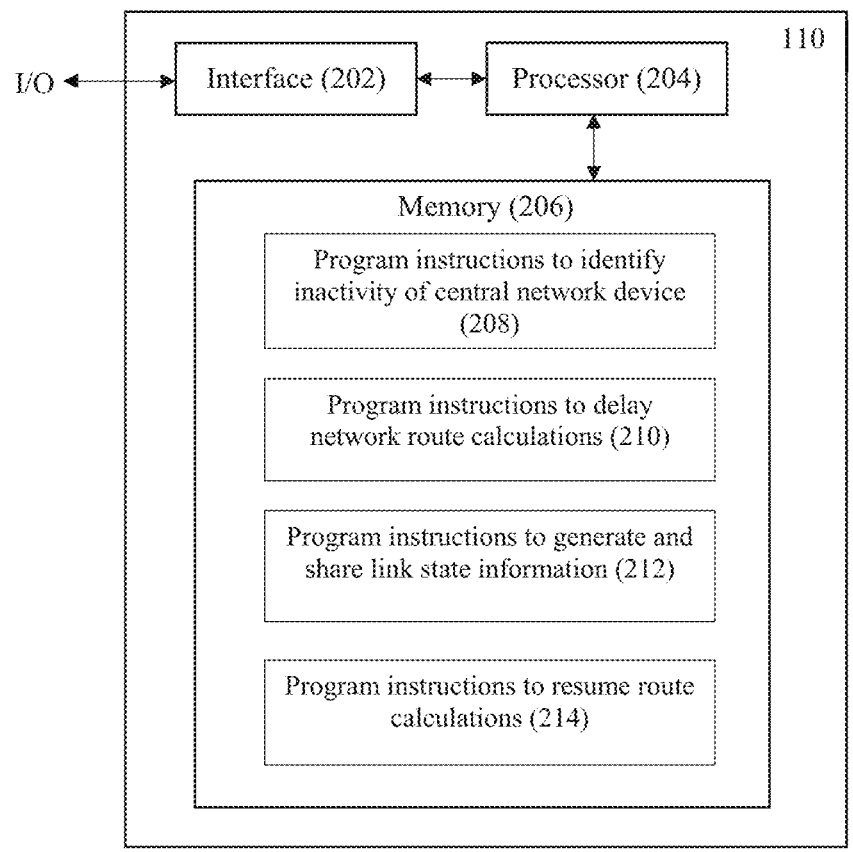
FIG. 2 illustrates a block diagram showing different components of a central network device used for eliminating data loss in a virtually aggregated network, in accordance with an embodiment of the present disclosure.

FIG. 2 illustrates a block diagram showing different components of the central network device 110 used for eliminating data loss in the virtually aggregated network 100, in accordance with an embodiment of the present disclosure. The central network device 110 may comprise an interface 202, a processor 204, and a memory 206. The memory 206 may store program instructions for performing several functions for eliminating data loss in the virtually aggregated network 100. A few such program instructions stored in the memory 206 includes program instructions to identify inactivity of central network device 208, program instructions to delay network route calculations 210, program instructions to generate and share link state information 212, and program instructions to resume route calculations 214.

The program instructions to identify inactivity of central network device 208 may cause the processor 204 to identify inactivity of the central network device 110 which is generally responsible for distributing routing information between a plurality of network devices. The program instructions to delay network route calculations 210 may cause the processor 204 to update the plurality of network devices to delay their network route calculations until another network device is elected amongst the plurality of network devices, to perform functions of the central network device 110. In an aspect, the other network device may be a backup central network device elected upon identifying inactivity of the central network device. Further, the central network device 110 may update the plurality of network devices about a time period for delaying the route calculations.

The program instructions to generate and share link state information 212 may cause the processor 204 to generate and share link state information related to the plurality of network devices. The link state information may comprise routing information related to the plurality of network devices, and is used by each of the plurality of network devices in determining shortest network paths to other network devices of the plurality of network devices. The program instructions to resume route calculations 214 may cause the processor 204 to resume route calculations upon receipt of the link state information by the plurality of network devices. Detailed functioning of such program instructions will become evident upon reading the details provided successively.

Figure 3:
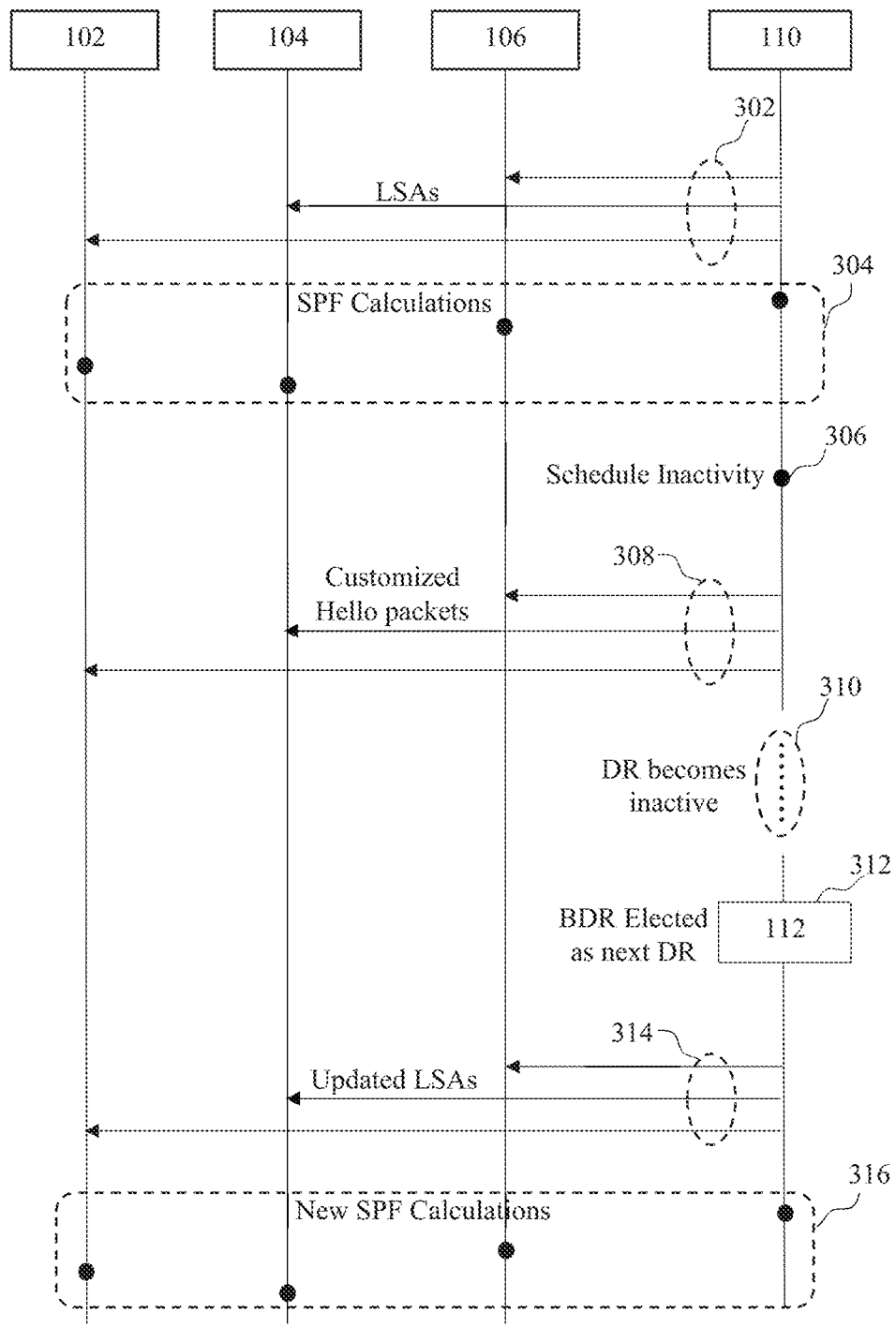
FIG. 3 illustrates a data flow diagram showing information exchange between a designated router and other network devices during a scheduled inactivity of the designated router, in accordance with an embodiment of the present disclosure.

FIG. 3 illustrates a data flow diagram showing exchange of information between the central network device 110 i.e. the DR and the network devices 102, 104, and 106, during a scheduled inactivity of the DR.

The central network device 110 i.e. the DR may receive adjacency information from the plurality of network devices 102, 104, and 106. The adjacency information may include details of distance of each network device with its neighboring network devices. Using such adjacency information, the central network device 110 i.e. the DR may generate Link State Advertisements (LSAs). Such LSAs may be required by each network device for determining shortest network paths to other network devices.

At instance 302, the central network device 110 i.e. the DR may broadcast the LSAs to the network devices 102, 104, and 106. Upon receiving the LSAs, each of the network devices 102, 104, 106, and 110 may start performing Shortest Path First (SPF) calculations independently, at instance 304. The network devices 102, 104, 106, and 110 may finish the SPF calculations at different time periods. In an exemplary scenario, as illustrated in FIG. 3, the central network device 110 i.e. the DR, may perform the SPF calculations first, followed by the network devices 106, 102, and 104 respectively.

At instance 306, the central network device 110 i.e. the DR may schedule its inactivity for a brief time period. The central network device 110 i.e. the DR may plan such inactivity to address a software update, maintenance, or software rebooting issue. Thereupon, at instance 308, the central network device 110 i.e. the DR may broadcast information about its planned inactivity to each of the network devices 102, 104, and 106. In one implementation, the central network device 110 i.e. the DR may broadcast customized connectivity determining data packets, such as customized Hello packets, to the network devices 102, 104, and 106, to inform about its planned inactivity. The customized Hello packets are prepared by modifying Type Length Values (TLVs) associated with the Hello packets. Modification of these TLVs included in the customized Hello packets may communicate details of the planned inactivity, for example a time when the central network device 110 i.e. the DR is planning to become inactive. Further, the customized Hello packets may be broadcasted continuously at fixed time intervals, by the central network device 110 i.e. the DR, until the planned inactivity has occurred.

At instance 310, the central network device 110 i.e. the DR may become inactive. During inactivity of the central network device 110 i.e. the DR, the network devices 102, 104, and 106 do not start performing new SPF calculations. Instead, the network devices 102, 104, and 106 may wait for election of a new DR, before performing the new SPF calculations. In one case, the network devices 102, 104, and 106 may hold the new SPF calculations for a predefined time period indicated by the TLV of the customized Hello packets. The predefined time period may be proportional to a time that is generally spent in election of a next DR, for example 5 to 10 seconds. Such predefined time period would also prevent indefinite delay in performing the new SPF calculations. For example, if the new DR is not elected within the predefined time period, the network devices 102, 104, and 106 may start performing new SPF calculations upon expiry of the predefined time period.

After the central network device 110 i.e. the DR becomes inactive, the network device 112 i.e. BDR may be elected as the next central network device i.e. the next DR, at instance 312. Upon being elected as the next DR, the network device 112 may determine updated LSAs. Thereupon, the network device 112 i.e. the next DR may broadcast the updated LSAs with the network devices 102, 104, and 106, at instance 314. Upon receiving the updated LSAs, the network devices 102, 104, and 106 may independently perform new SPF calculations, at instance 316. Using the updated LSAs, the network devices 102, 104, and 106 may perform and complete the new SPF calculations at different time intervals, as illustrated at instance 316.

Therefore, upon implementation of the above described embodiment, data loss that occurs in conventional arrangement of virtually aggregated networks, upon a scheduled inactivity of a central network device i.e. a DR, is eliminated by holding new SPF calculations till a next DR is elected. Therefore, continued movement of North-South bound data is provided in a virtually aggregated network by implementation of the embodiments described above.

Figure 4:
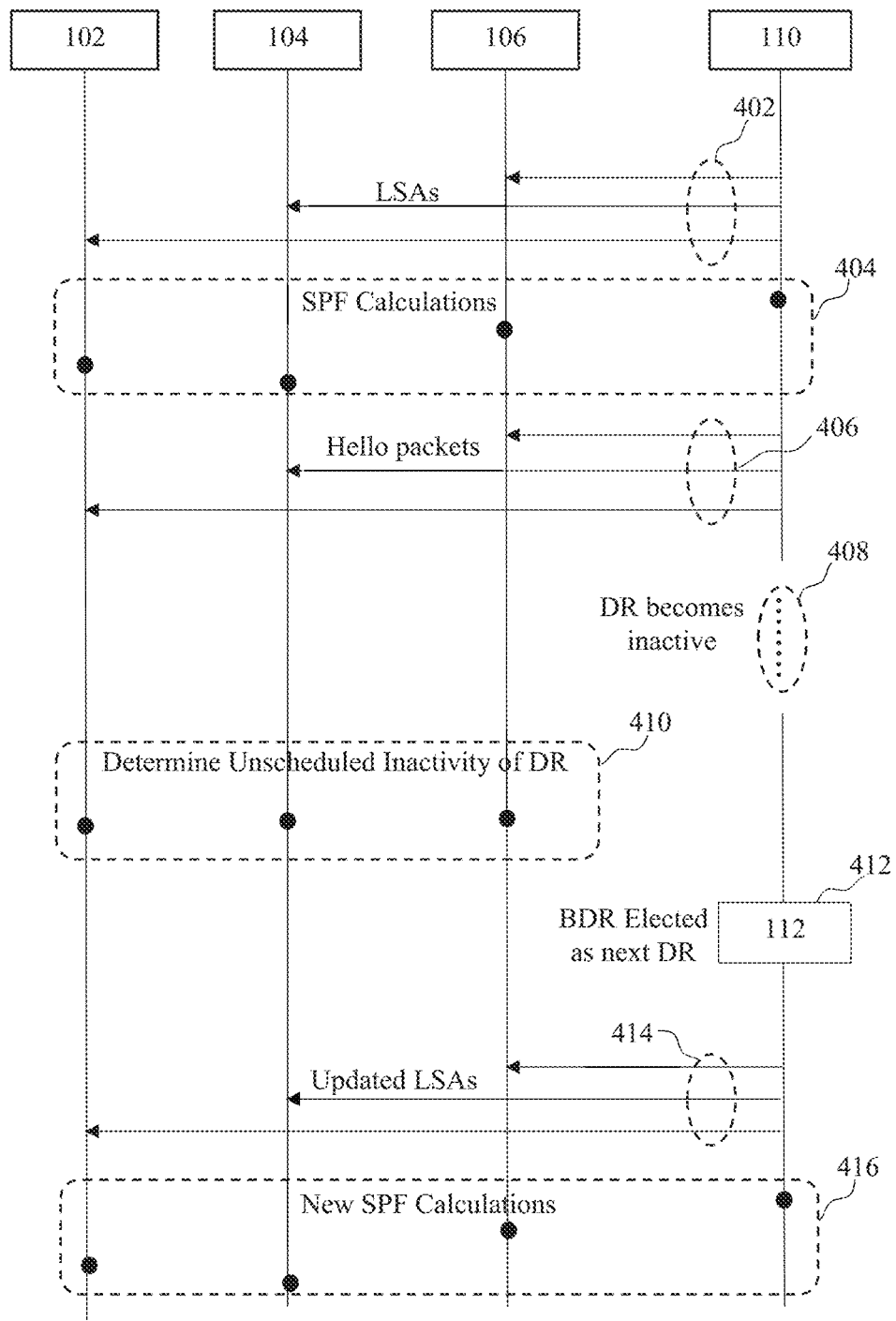
FIG. 4 illustrates a data flow diagram showing information exchange between a designated router and other network devices during an unscheduled inactivity of the designated router, in accordance with an embodiment of the present disclosure.

FIG. 4 illustrates a data flow diagram showing exchange of information between the central network device 110 i.e. the DR and the network devices 102, 104, and 106, during an unscheduled inactivity of the DR.

The central network device 110 i.e. the DR may receive adjacency information from the plurality of network devices 102, 104, and 106. The adjacency information may include details of distance of each network device with its neighboring network devices. Using such adjacency information, the central network device 110 i.e. the DR may generate Link State Advertisements (LSAs). Such LSAs may be required by each network device for determining shortest network paths to other network devices.

At instance 402, the central network device 110 i.e. the DR may broadcast the LSAs to the network devices 102, 104, and 106. Upon receiving the LSAs, each of the network devices 102, 104, 106, and 110 may start performing Shortest Path First (SPF) calculations independently, at instance 404. The network devices 102, 104, 106, and 110 may finish the SPF calculations at different time periods. In an exemplary scenario, as illustrated in FIG. 4, the central network device 110 i.e. the DR, may perform the SPF calculations first, followed by the network devices 106, 102, and 104 respectively.

At instance 406, the central network device 110 i.e. the DR may broadcast connectivity determining data packets, such as Hello packets to the network devices 102, 104, and 106. Receipt of such Hello packets would indicate that the central network device 110 i.e. the DR is active and properly functioning. Generally, the Hello packets may be broadcasted by the central network device 110 i.e. the DR repeatedly at predefined time intervals, for example at every 10 seconds.

In one scenario, the central network device 110 i.e. the DR may suddenly become inactive, at instance 408. Such inactivity of the central network device 110 i.e. the DR may be caused due to unscheduled events such as hardware failure, power outage, or a software failure. In such scenario, the network devices 102, 104, and 106 may not receive the Hello packets from the central network device 110 i.e. the DR, continuously for a predefined number of time intervals. In such case, unscheduled inactivity of the central network device 110 i.e. the DR may be determined by the network devices 102, 104, and 106, at instance 410. It is possible that one of the network devices 102, 104, and 106 determines the unscheduled inactivity of the central network device 110 i.e. the DR and communicates such information to remaining network devices.

Upon determining the unscheduled inactivity of the central network device 110 i.e. the DR, the network devices 102, 104, and 106 may hold off their new SPF calculations until a next DR is elected. In one case, the network devices 102, 104, and 106 may hold the new SPF calculations for a predefined time period. The predefined time period may be proportional to a time that is generally spent in election of a new DR, for example 5 to 10 seconds. Such predefined time period may be pre-configured in the network devices 102, 104, and 106. Such predefined time period would also prevent indefinite delay in performing the new SPF calculations. For example, if the new DR is not elected within the predefined time period, the network devices 102, 104, and 106 may start performing new SPF calculations upon expiry of the predefined time period.

In one case, the network device 112 i.e. BDR may be elected as the next central network device i.e. the next DR, at instance 412. Upon being elected as the next DR, the network device 112 may determine updated LSAs. Thereupon, the network device 112 may broadcast the updated LSAs with the network devices 102, 104, and 106, at instance 414. Upon receiving the updated LSAs, the network devices 102, 104, and 106 may independently perform new SPF calculations, at instance 416. Using the updated LSAs, the network devices 102, 104, and 106 may perform and complete the new SPF calculations at different time intervals, as illustrated at instance 416.

Therefore, upon implementation of the above described embodiment, data loss that occurs in conventional arrangement of virtually aggregated networks, upon an unscheduled inactivity of a central network device i.e. a DR, is eliminated by holding new SPF calculations till a next DR is elected. Therefore, continued movement of North-South bound data is provided in a virtually aggregated network by implementation of the embodiments described above.

Figure 5:
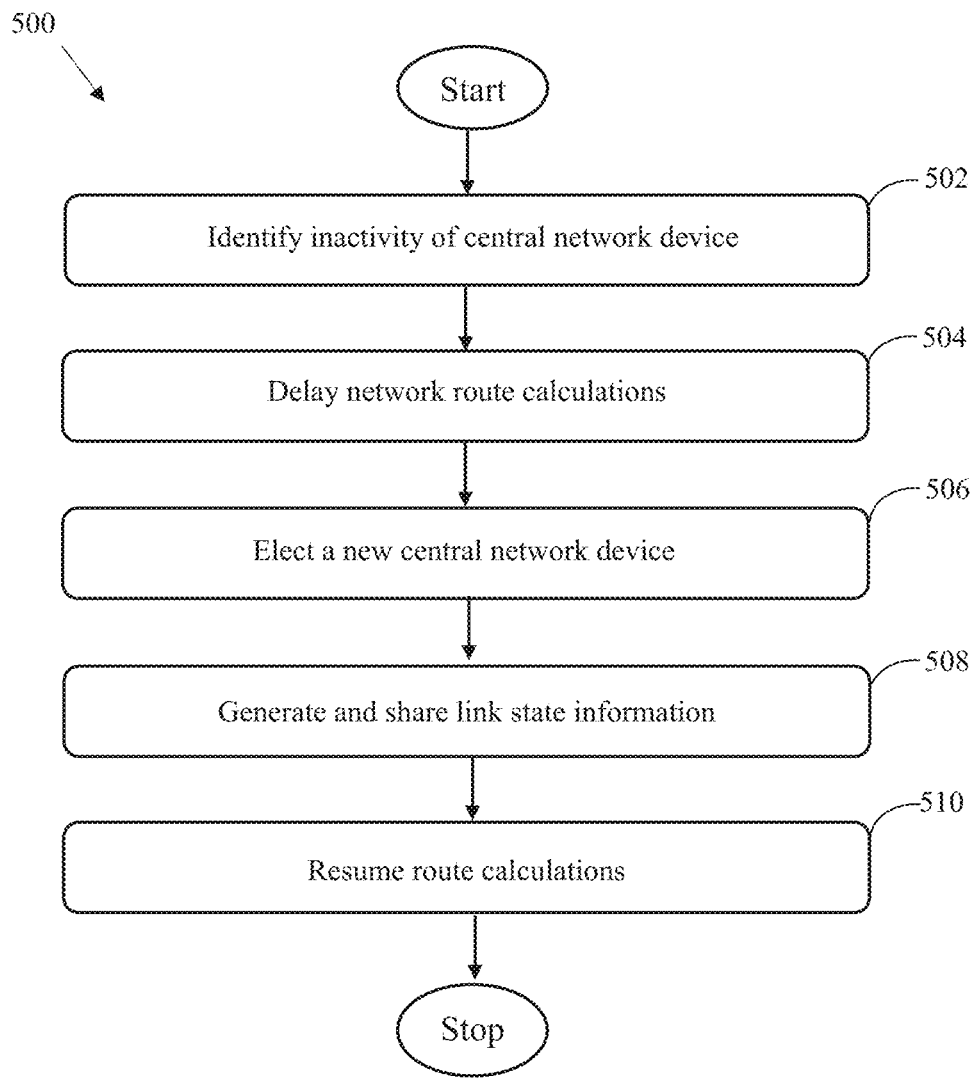
FIG. 5 illustrates a flowchart showing a method for eliminating data loss in a virtually aggregated network, in accordance with an embodiment of the present disclosure.

Referring now to FIG. 5, a method of eliminating data loss in a virtually aggregated network is described with reference to the flowchart 500. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 5 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

At block 502, inactivity of a central network device may be identified. The central network device may be a Designated Router (DR) responsible for distributing routing information between a plurality of network devices connected in the virtually aggregated network. The central network device may be a virtually aggregated network switch formed by linking of a plurality of network switches. The central network device may update the plurality of network devices about an inactivity of the central network device and a predefined time period for delaying the route calculations. The predefined time period for delaying the route calculations may be informed through Type Length Value (TLV) associated with customized Hello packets. The predefined time period could be user defined, or such predefined time period could be set, via configuration, in the plurality of network devices.

At block 504, network route calculations to be performed by the plurality of network devices may be delayed. The network route calculations may be delayed till a new DR is elected amongst the plurality of network devices or till expiry of the predefined time period.

At block 506, a new central network device may be elected. The new central network device may be elected from the plurality of network devices. Preferably, a Backup Designated Router (BDR) may be elected as the new central network device.

At block 508, the new central network device may generate link state information related to the plurality of network devices. The link state information may then be shared with the plurality of network devices for performing route calculations. In an aspect, the link state information may be shared as Link State Advertisement (LSA).

At block 510, the plurality of network devices may resume their route calculation upon receiving the link state information. In this manner, the route information may not be withdrawn immediately by the plurality of network devices when a central network device i.e. a DR goes down. Therefore, in a virtually aggregated network, unobstructed flow of data traffic in North-South direction and South-North direction is maintained, even when the DR becomes inactive.

An embodiment of the disclosure may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set as claimed in claims that issue from this application, in the specific form in which such claims issue, including any subsequent correction.

A virtually aggregated network may be implemented using wired and/or wireless communication technologies. The virtually aggregated network may comprise various network components such as switches, Provide Edge (PE) routers, Customer Edge (CE) routers, intermediate routers, bridges, computers, servers, and the like. The network devices present in the virtually aggregated network may implement an Interior Gateway Protocol (IGP) including, but not limited to, Open Shortest Path First (OSPF), Routing Information Protocol (RIP), Intermediate System to Intermediate System (IS-IS), and Enhanced Interior Gateway Routing Protocol (EIGRP).

An interface may be used to provide input or fetch output from the system. The interface may be implemented as a Command Line Interface (CLI), Graphical User Interface (GUI). Further, Application Programming Interfaces (APIs) may also be used for remotely interacting with the system.

A processor may include one or more general purpose processors (e.g., INTEL®, or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

A memory may include, but is no limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

We claim:

1. A method comprising:
   determining, by a first network device in a network, inactivity of a central network device responsible for distributing routing information among a plurality of network devices, including the first network device, in the network, wherein the central network device is a virtually aggregated network switch formed by linking a plurality of network devices;
   delaying, by the first network device, network route calculations until a second network device is elected from the plurality of network devices, to perform functions of the central network device;
   receiving, by the first network device from the second network device, link state information comprising routing information associated with the plurality of network devices, wherein the link state information is used by the plurality of network devices in determining shortest network paths in the network;
   in response to receiving the link state information, determining, by the first network device, that the second network device is elected to perform the functions of the central network device; and
   resuming, by the first network device, the route calculations based on the link state information received from the second network device.

2. The method as claimed in claim 1, wherein the first network device performs the route calculations based on Open Shortest Path First (OSPF) protocol.

3. The method as claimed in claim 1, wherein the inactivity of the central network device is scheduled to address one of: a software update, software failure, maintenance, or a software rebooting issue.

4. The method as claimed in claim 3, wherein the scheduled inactivity of the central network device is determined through customized connectivity determining data packets received from the central network device, wherein the customized connectivity determining data packets include customized values of fields indicating a time of the scheduled inactivity.

5. The method as claimed in claim 1, wherein the inactivity of the central network device is unscheduled to address one of: a hardware failure, power outage, or a software failure.

6. The method as claimed in claim 5, wherein the unscheduled inactivity of the central network device is determined in response to not receiving connectivity determining data packets from the central network device for a predefined time interval.

7. The method as claimed in claim 1, wherein the second network device is a backup central network device of the central network device.

8. A computer system, comprising:
   at least one processing resource;
   a storage device storing instructions executable by the at least one processing resource to:
      determine inactivity of a central computer system responsible for distributing routing information among a plurality of computer systems, including the computer system, in a network, wherein the central computer system is a virtually aggregated device formed by linking a plurality of computer systems;
      delay network route calculations until a second computer system is elected from the plurality of computer systems, to perform functions of the central computer system;
      receive link state information comprising routing information associated with the plurality of computer systems, wherein the link state information is used by the plurality of computer systems in determining shortest network paths in the network;
      in response to receiving the link state information, determine that the second computer system is elected to perform the functions of the central computer system;
      resume the route calculations based on the link state information received from the second computer system.

9. The computer system as claimed in claim 8, wherein the computer system performs the route calculations based on Open Shortest Path First (OSPF) protocol.

10. The computer system as claimed in claim 8, wherein the inactivity of the central computer system is scheduled to address one of: a software update, software failure, maintenance, or a software rebooting issue.

11. The computer system as claimed in claim 10, wherein the scheduled inactivity of the central computer system is determined through customized connectivity determining data packets received from the central computer system, wherein the customized connectivity determining data packets include customized values of fields indicating a time of the scheduled inactivity.

12. The computer system as claimed in claim 8, wherein the inactivity of the central computer system is unscheduled to address one of: a hardware failure, power outage, or a software failure.

13. The computer system as claimed in claim 12, wherein the unscheduled inactivity of the central computer system is determined in response to not receiving connectivity determining data packets are not received for predefined time interval from the central computer system.

14. The computer system as claimed in claim 8, wherein the second computer system is a backup central computer system of the central computer system.

15. A non-transitory machine-readable storage medium having stored thereon machine-readable instructions to cause a computer processor to:
   determine, by a first network device in a network, inactivity of a central network device responsible for distributing routing information among a plurality of network devices, including the first network device, in the network, wherein the central network device is a virtually aggregated network switch formed by linking a plurality of network devices;
   delay, by the first network device, network route calculations until a second network device is elected from the plurality of network devices, to perform functions of the central network device;
   receive, by the first network device from the second network device, link state information comprising routing information associated with the plurality of network devices, wherein the link state information is used by the plurality of network devices in determining shortest network paths in the network;
   in response to receiving the link state information, determine, by the first network device, that the second network device is elected to perform the functions of the central network device; and
   resume, by the first network device, the route calculations response to receiving the link state information from the second network device.

16. The non-transitory machine-readable storage medium as claimed in claim 15, wherein the first network device performs the route calculations based on Open Shortest Path First (OSPF) protocol.

17. The non-transitory machine-readable storage medium as claimed in claim 15, wherein the inactivity of the central network device is scheduled to address one of: a software update, software failure, maintenance, or a software rebooting issue.

18. The non-transitory machine-readable storage medium as claimed in claim 17, wherein the scheduled inactivity of the central network device is determined through customized connectivity determining data packets received from the central network device, wherein the customized connectivity determining data packets include customized values of fields indicating a time of the scheduled inactivity.

19. The non-transitory machine-readable storage medium as claimed in claim 15, wherein the inactivity of the central network device is unscheduled to address one of: a hardware failure, power outage, or a software failure.

20. The non-transitory machine-readable storage medium as claimed in claim 19, wherein the unscheduled inactivity of the central network device is determined in response to not receiving connectivity determining data packets from the central network device for a predefined time interval.

* * * * *